(12) United States Patent
Hanes et al.

(10) Patent No.: US 6,460,010 B1
(45) Date of Patent: Oct. 1, 2002

(54) METHOD AND APPARATUS FOR STATISTICAL COMPILATION

(75) Inventors: Gordon G. G. Hanes, Ottawa; Mainz Tong, Kanata; Martin Darwin, Ottawa, all of (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/401,569

(22) Filed: Sep. 22, 1999

(51) Int. Cl.[7] .............................................. G06F 101/14
(52) U.S. Cl. ........................ 702/179; 358/296; 395/432; 702/186; 711/105
(58) Field of Search ................................ 702/179, 185, 702/186; 707/200; 711/5, 154, 155

(56) References Cited

U.S. PATENT DOCUMENTS

| | | | | |
|---|---|---|---|---|
| 5,146,344 A | * | 9/1992 | Bennett et al. | 358/296 |
| 5,787,267 A | * | 7/1998 | Leung et al. | 395/432 |
| 5,809,450 A | * | 9/1998 | Chrysos et al. | 702/186 |
| 5,875,452 A | * | 2/1999 | Katayama | 711/105 |
| 6,000,007 A | * | 12/1999 | Leung et al. | 711/105 |

* cited by examiner

*Primary Examiner*—Arthur T. Grimley
*Assistant Examiner*—John Le

(57) ABSTRACT

A method and apparatus for statistical compilation is presented. The statistical compilation circuit includes a multi-bank memory that stores a plurality of statistics, where a statistic component portion for each statistic is stored in each of the plurality of banks in the multi-bank memory. An arbitration block is operably coupled to receive at least one statistical update stream. Each statistical update stream includes a plurality of statistical updates, where each statistical update includes a statistic identifier and an update operand. The arbitration block schedules received statistical updates to produce a scheduled update stream. A control block operably coupled to the arbitration block and the multi-bank memory executes the updates included in the scheduled update stream. The control block retrieves the current value of one of the statistic component portions from one of the memory banks and combines the current value with the update operand of a corresponding statistical update. The resulting updated component value is then stored back into the memory bank from which it was read. When a processing block that is operably coupled to the control block issues a statistic request corresponding to a particular requested statistic, the control block fetches each of the component portions from each of the memory banks corresponding to that particular statistic and combines the component portions to produce a total statistic value.

20 Claims, 6 Drawing Sheets

METHOD AND APPARATUS FOR STATISTICAL COMPILATION

FIELD OF THE INVENTION

The invention relates generally to statistical compilation, and more particularly to statistical compilation in a communications network.

BACKGROUND OF THE INVENTION

In data communication systems or other data processing systems that involve a large number of statistics that have to be maintained, maintenance of the statistics can become a complicated task that consumes a relatively large amount of available resources in the system. For example, in a data communication system a number of parameters relating to data traffic must be maintained for billing purposes, network maintenance, and the like. Each of these statistics may be stored in a memory structure such that periodically the statistics can be retrieved and analyzed to generate billing information, perform network utilization studies, etc. Each time a particular statistic needs to be updated in the memory, the current value stored in the memory must be read, the modification to the value made, and the resulting value stored back into the memory.

Having to perform these statistical updates can consume a significant amount of the available resources of the data path processors within the communication network. This may interfere with the level of efficiency with which the data path processors perform the other functions which they are designed to perform, such as those associated with directing data traffic through the network. The degradation in efficiency becomes increasingly significant as traffic speeds and the number of statistics maintained increase.

Therefore, a need exists for a method and apparatus for statistical compilation that reduces the resources required on the part of the function components in the system, such as data path processors in a communication network.

DETAILED DESCRIPTION

Generally, the present invention provides a method and apparatus for statistical compilation. The statistical compilation circuit includes a multi-bank memory that stores a plurality of statistics, where a statistic component portion for each statistic is stored in each of the plurality of banks in the multi-bank memory. An arbitration block is operably coupled to receive at least one statistical update stream. Each statistical update stream includes a plurality of statistical updates, where each statistical update includes a statistic identifier and an update operand. The arbitration block schedules received statistical updates to produce a scheduled update stream. A control block operably coupled to the arbitration block and the multi-bank memory executes the updates included in the scheduled update stream. The control block retrieves the current value of one of the statistic component portions from one of the memory banks and combines the current value with the update operand of a corresponding statistical update. The resulting updated component value is then stored back into the memory bank from which it was read. When a processing block that is operably coupled to the control block issues a statistic request corresponding to a particular requested statistic, the control block fetches each of the component portions from each of the memory banks corresponding to that particular statistic and combines the component portions to produce a total statistic value.

Figure 1:
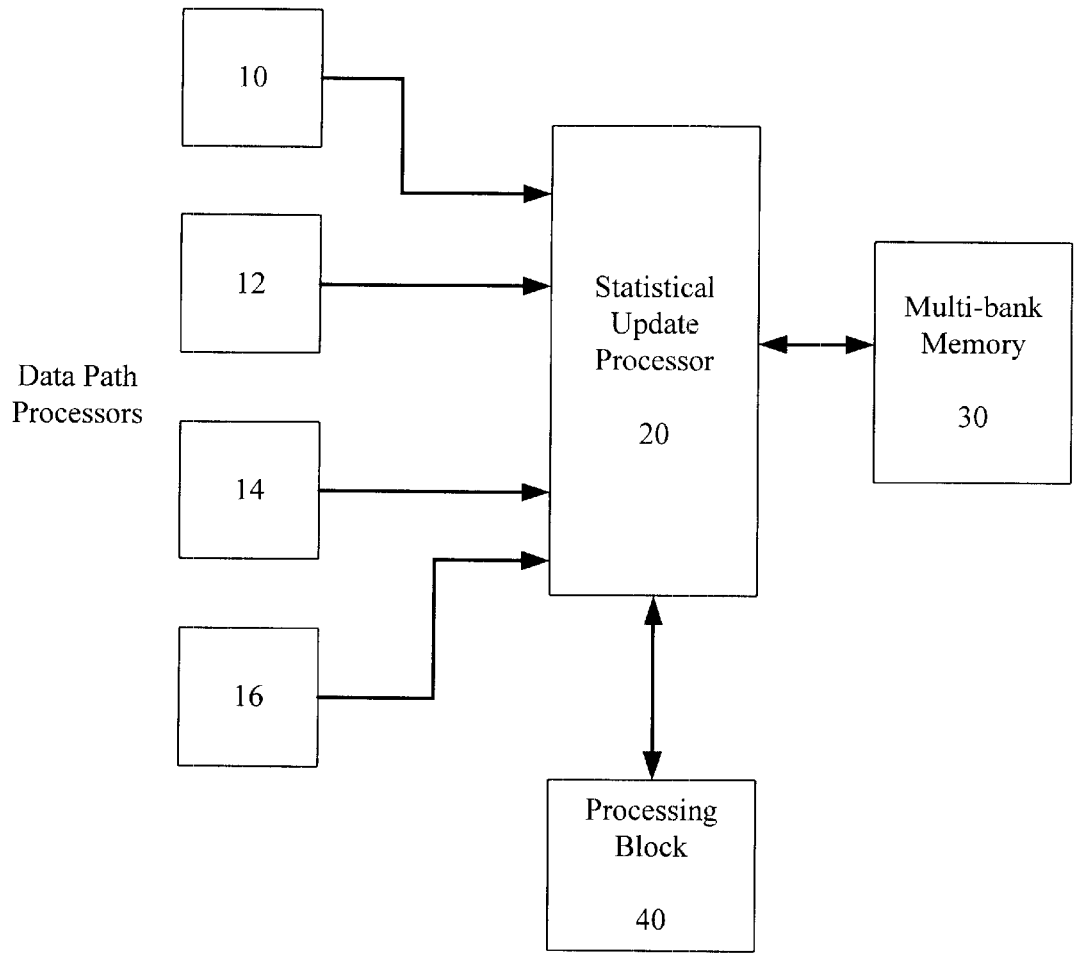
FIG. 1 illustrates a block diagram of a statistical compilation circuit in accordance with a particular embodiment of the present invention.

The invention can be better understood with reference to FIGS. 1–7. FIG. 1 illustrates a block diagram of a statistical compilation circuit coupled to a plurality of data path processors 10–16. The statistical compilation circuit includes a statistic update processor 20 operably coupled to the multi-bank memory 30. Each of the data path processors 10–16 issues statistical updates to the statistic update processor 20, which maintains the statistics in the multi-bank memory 30. The processing block 40 issues statistic request commands to the statistic update processor 20. In response, the statistic update processor 20 determines the present value of the particular statistic being requested by the processing block 40 and returns the present value of that statistic. The interaction of these various blocks is discussed in additional detail with respect to FIGS. 2–5 below.

In order to minimize the processing resources consumed through statistic update operations by the data path processors 10–16, the format of each statistical update is standardized. Each statistical update includes a statistic identifier, which identifies the particular statistic to be updated, and an update operand, which represents the change in the particular statistic. For example, one statistical update may correspond to the billing statistic for a particular user on a data communications network. In such case, one of the data path processors 10–16 would issue a statistical update that includes a statistic identifier that indicates the billing statistic for the particular user is to be updated. The update operand included in the statistical update would indicate the change to that particular statistic, which in the example may be to increment the billing statistic by a certain amount.

The statistic update processor 20 receives the statistical updates in the form of data stream from each of the data path processors 10–16. As such, the statistic update processor 20 can off-load from the data path processors 10–16 all of the read, modification, and writing operations required to update statistics. Each of the data path processors 10–16 merely issues a single command that contains all of the required information for the statistic update processor 20 to adequately maintain the various statistics for the network.

Because the statistic update processor 20 is typically required to process a large number of statistical updates, the memory used to store the statistics is preferably a multi-bank memory 30. Utilizing a multi-bank memory allows multiple component portions for each statistic to be maintained in each of the banks within the memory. This allows a number of update operations to be performed in quick succession, while ensuring that multiple updates to a single statistic do not interfere with each other. In prior art attempts that included one statistic value within a conventional memory structure, the speed with which the statistics could be updated was limited. Using multiple component values distributed throughout multiple banks within the multi-bank 30 allows for much for efficient memory accesses. Utilizing the multiple banks, there are no problems with sequential updates to the same statistic, and the memory can effectively be operated at a much higher rate of speed. Additional efficiencies are achieved by sequencing multiple statistic updates such that down time associated with switching between reading and writing operations to the multi-bank memory 30 is reduced. This increases the bandwidth available for updating statistics and will be discussed in additional detail below.

When the processing block 40 issues a statistic request to the statistic update processor 20, each of the component values for the statistic are read from the multi-bank memory 30 and combined to produce a total statistic value that is provided in response to the statistic request. Thus, although multiple component values are contained within the multi-bank memory 30, a single value is returned to any entity requesting the current value of a statistic.

Figure 2:
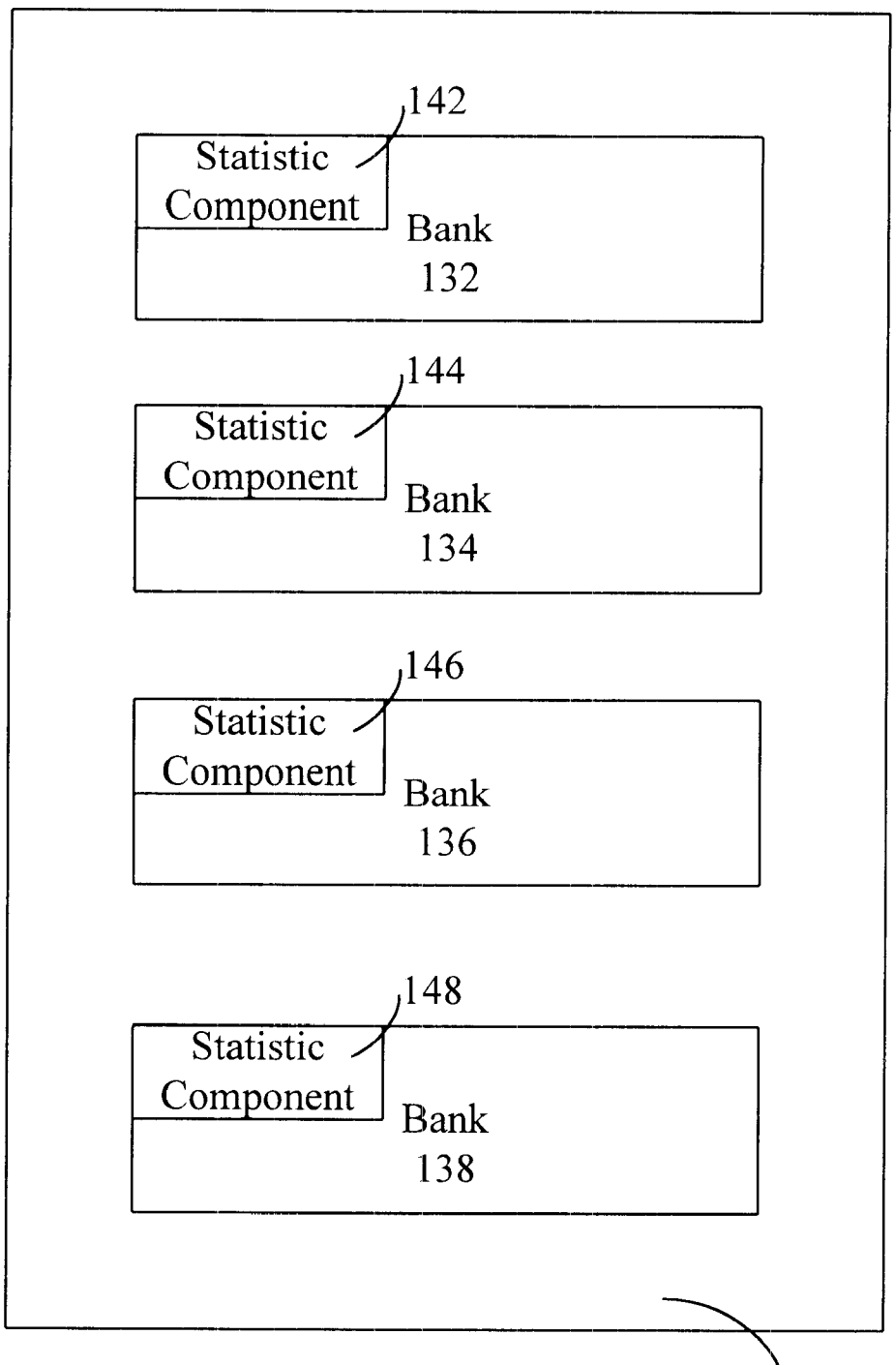
FIG. 2 illustrates a block diagram of a multi-bank memory in accordance with a particular embodiment of the present invention.

FIG. 2 illustrates a more detailed view of the multi-bank memory 30. As is illustrated, the multi-bank memory 30 includes a plurality of banks 132–138. The multi-bank memory 30 may be a single SDRAM integrated circuit that includes a plurality of banks within a single memory circuit. In other embodiments, the multi-bank memory may be a plurality of memory integrated circuits, where each of the plurality of memory integrated circuits includes one or more banks. Thus, various combinations of memory circuits can be utilized to construct the multi-bank memory 30.

Each of the banks 132–138 stores a component value corresponding to a particular statistic 142–148, respectively. Therefore, when a statistical update is to be performed, the statistic update processor 20 can retrieve the current value stored in any of the components 142–148 in order to perform the update. Once the statistic update processor 20 has made the modification to the component value, it is stored back in the appropriate memory bank. When a statistic request is received by the statistic update processor 20, all of the statistic component values 142–148 are read and combined together to produce the total statistic value for the requested statistic.

Figure 3:
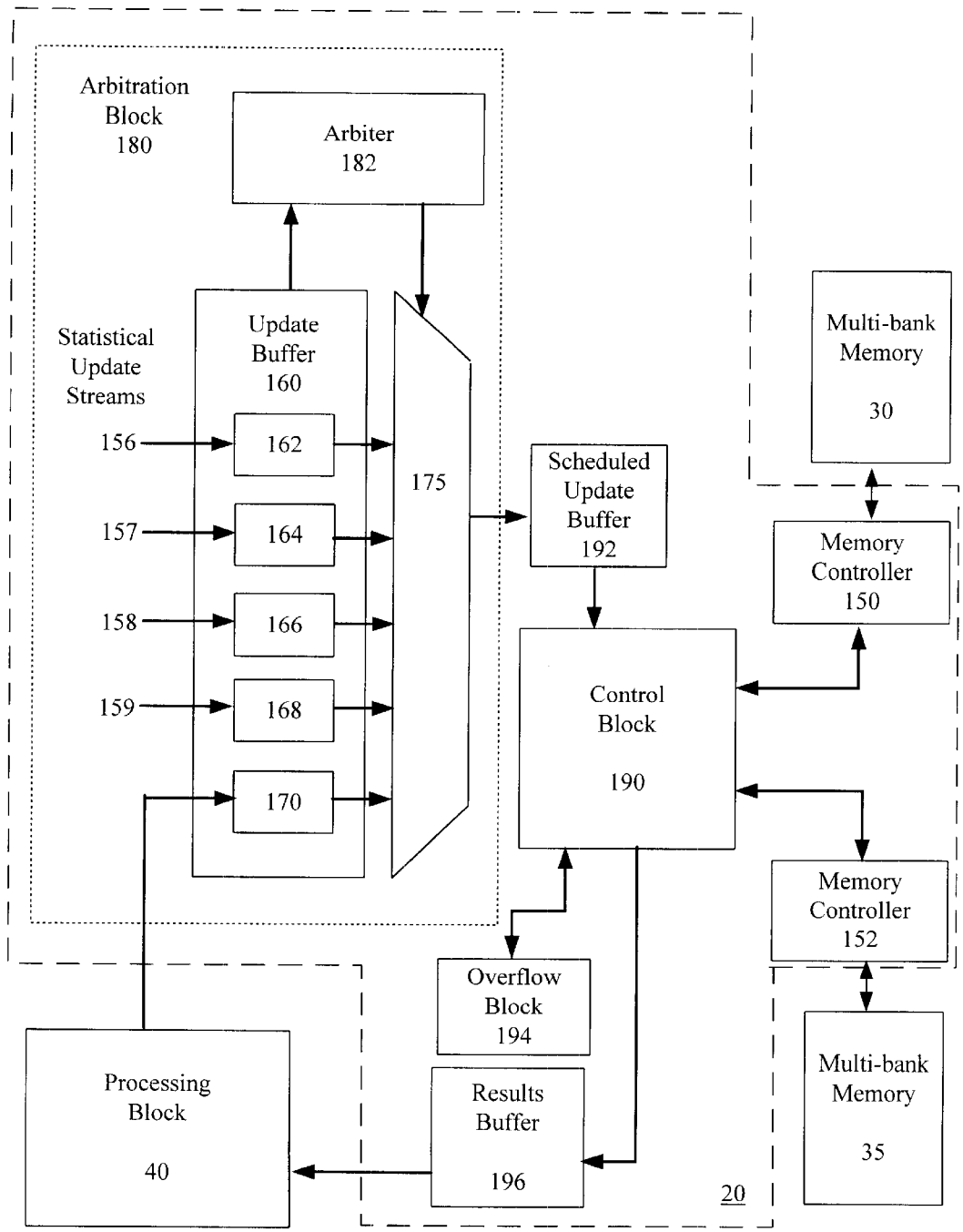
FIG. 3 illustrates a block diagram of a more detailed view of the statistical compilation circuit in accordance with a particular embodiment of the present invention.

FIG. 3 illustrates a more detailed view of components that may be included in the statistical compilation circuit. In particular, much more detail is shown with regard to the statistic update processor 20. The statistic update processor 20 is shown to include an arbitration block 180 and a control block 190. As is illustrated, the arbitration block 180 receives a plurality of statistical update streams 156–159. These streams may be provided to the update buffer 160, such that statistical updates can be buffered prior to their prioritization and forwarding for execution. The update buffer 160 may include a plurality of individual stream buffers 162–168, where each of the stream buffers 162–168 buffers a corresponding statistical update stream 156–159. Also included in the update buffer 160 may be a statistic request buffer 170 that buffers statistic requests issued by the processing block 40.

An arbiter 182 within the arbitration block 180 controls the sequential execution of the received statistical updates. Thus, the arbiter 182 receives notification of pending statistical updates from the update buffer 160 and prioritizes the statistical updates via the selection block 175 to produce a scheduled update stream. The scheduled update stream may be buffered by a scheduled update stream buffer 192 that is coupled to the selection block 175. Buffering of the various updates and requests helps to improve the overall throughput of the statistical compilation circuit.

The arbitration performed by the arbiter 182 may be based on a round-robin scheme, a weighted fair queuing technique, or some other prioritization scheme. The weighted fair queuing technique may schedule the updates based on the priority level of each statistical update stream, the loading level of each statistical update stream buffer, or some combination of these two factors. In another embodiment, the arbiter 182 includes a receipt sequence priority encoder such that statistic updates are performed in temporal order based on order of receipt. Such an embodiment is described and discussed in more detail with FIG. 4.

The control block 190 compiles a set of read operations based on the scheduled update stream, where each read operation corresponds to a scheduled update. Each read operation retrieves a component value of one of the statistic component portions for the particular statistic from one of the plurality of banks of the multi-bank memory 30. The control block 190 then combines the operand for the particular scheduled update with the component value that has been retrieved to produce an updated component value. The control block 190 preferably includes an adder that combines the operand for the particular scheduled update with the component value to produce the updated component value.

The control block 190 also compiles a set of write operations corresponding to the set of read operations such that the write operations overwrite component values fetched by the set of read operations. The write operations store the updated component value produced through the combination operations. The control block 190 can include additional circuitry in order to optimize the execution of the read, write, and combination operations. These potential enhancements are described in more detail with respect to FIG. 5 below.

The control block 190 receives statistic requests from the processing block 40 via the arbitration circuitry such that statistic requests are serviced in accordance with the arbitration scheme. As described earlier, the control block 190 will fetch the required component values that are combined to provide the total statistic value returned in response to the statistic request from the processing block 40.

In order to enable the processing block 40 to operate more efficiently, a results buffer 196 may be included in the circuit such that multiple statistic requests can be serviced between accesses to the statistical compilation circuitry by the processing block 40. The processing block 40 can issue a plurality of statistic requests that are buffered in the statistic request buffer 170, and then perform other functions before reading the total statistic values for each of the requests from the results buffer 196.

As was described with respect to FIG. 2, each bank within the multi-bank memory 30, or at least a portion of the banks within the multi-bank memory 30, include a component value for each statistic. In embodiments where the space, or number of bits, provided for storage of each component are limited, overflow conditions can result from the combination of a received update operand and the currently stored component value. For example, if 30 bits are allotted within each memory bank for a particular component value, and the result of a combination operation between the present value of that component and a newly received update operand exceeds a value that can be encoded in 30 bits, an overflow block 194 may be utilized to store the rollover indication. Thus, when the control block 190 receives a statistic request for a statistic, it can check the overflow block 194 to determine if any of the component values stored within the multi-bank memory 30 have overflowed as the result of a combination operation. As such, the control block 190 can take this overflow condition into account when determining the total statistic value for the particular statistic.

In one embodiment, the statistic compilation circuit includes a plurality of multi-bank memories, which are illustrated in FIG. 3 as multi-bank memories 30 and 35. Each of these multi-bank memories can be used during different time intervals such that a current multi-bank memory is used to process current statistic updates, where the other multi-bank memory may store the results of the statistic updates for a prior time interval. For example, the multi-bank memory 30 may be used for the statistic updates for a 15-minute period, while the multi-bank memory 35 holds the statistic values for the prior 15-minute period. Thus, when the time period during which the multi-bank memory 30 is used to store updates expires, the multi-bank memory 35 may be switched to the current multi-bank memory, whereas the multi-bank memory 30 is relegated to storing the statistic values for the most recent time period. In other embodiments, the multiple multi-bank memories may be used to compile statistics for different time periods such that one compiles statistics on an hourly basis, while the other stores the statistics for a 24-hour period. One of ordinary skill in the art appreciates that different statistical time slices may be appropriate for different applications.

Each of the multi-bank memory structures 30 and 35 may have an associated memory controller 150 and 152, respectively. Each memory controller is operably coupled to the control block 190 and to a corresponding one of the multi-bank memories. The memory controllers 150 and 152 allow multiple memory operations to take place concurrently. In other words, the memory controllers 150 and 152 off-load the actual interaction with the multi-bank memories 30 and 35 from the control block 190.

Figure 4:
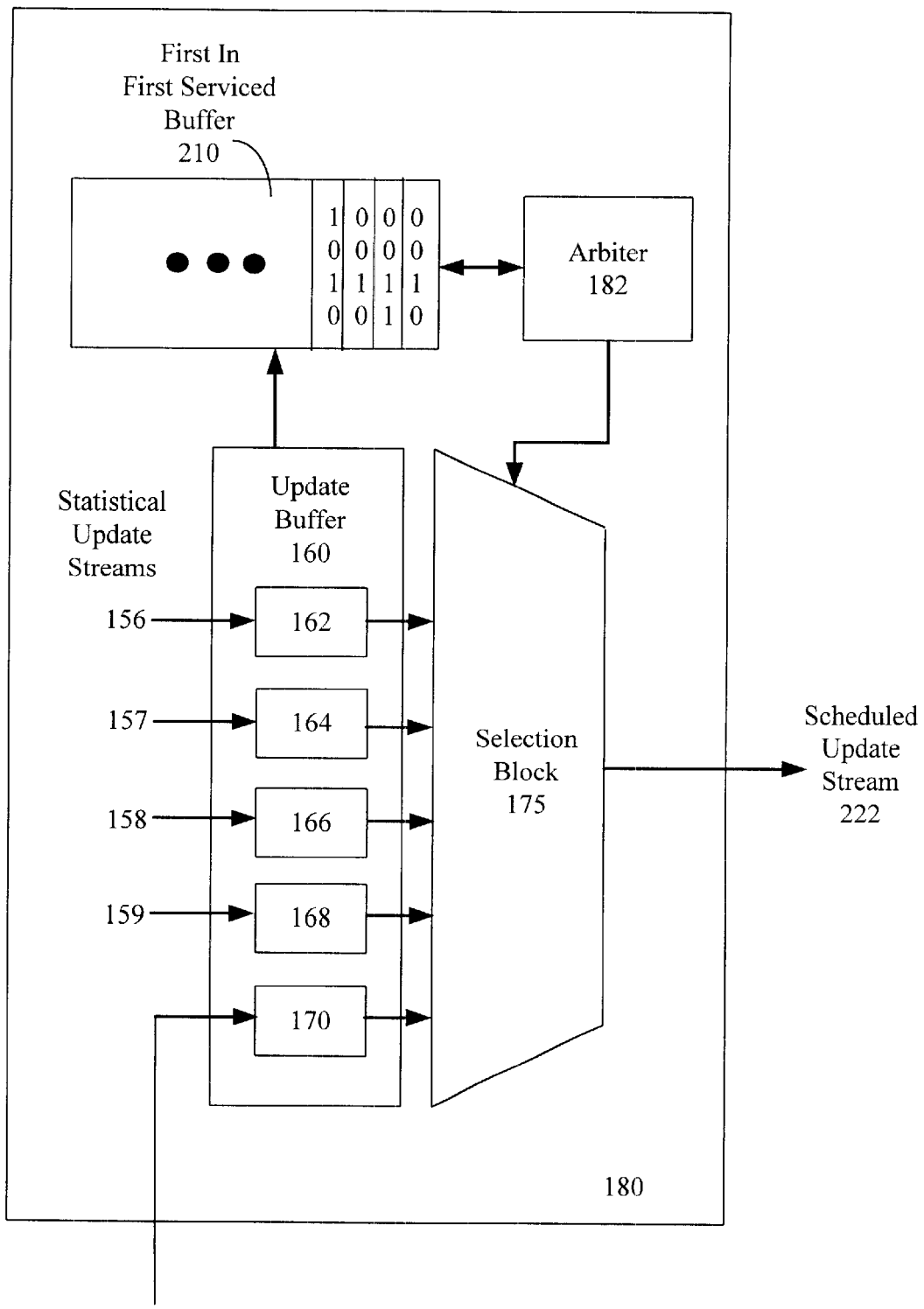
FIG. 4 illustrates a block diagram of a more detailed view of the arbitration block of the statistical compilation circuit illustrated in FIG. 3.

FIG. 4 illustrates a more detailed view of the arbitration block 180 in an embodiment where it includes a receipt sequenced priority encoder such that statistical updates are performed in temporal order based on order of receipt. In order to accomplish this, the arbitration block 180 includes a first-in/first-serviced buffer 210. The first-in/first-serviced buffer 210 stores a set of bits for each statistical update receipt interval. The set of bits indicates from which statistical update stream statistical updates were received for the statistical update receipt interval. By understanding when particular statistical updates were received from the statistical update streams 156–159, the arbiter 182 can control the prioritization of the statistical updates to produce the schedule update stream 222.

In the example illustrated, four statistical update streams 156–159 have the potential to provide a statistical update during any particular statistical update receipt interval. The statistical updates are stored in the statistical update buffers 162–168. The selection block 175 is controlled by the arbiter 182, which orders the statistical updates to produce the scheduled update stream 222.

In the example illustrated, each statistical update stream 156–159 has a corresponding bit for each statistical update receipt interval in the first-in/first-service buffer 210. Thus, the right-most column illustrates the oldest statistical update receipt interval currently stored in the first-in/first-service buffer 210. Assuming that the positioning of the bits within the column corresponds to the positioning of the streams in the diagram, the top-most bit location would correspond to the statistical update stream 156. The values illustrated in the right-most column show, in one embodiment, that the only statistical update stream that received a statistical update during that time interval was statistical update stream 158. This is signified by a bit that is set within the column. Similarly, the column directly to the left of the right-most column indicates that statistical updates were received in statistical update streams 158 and 159 during that particular time interval. The subsequent time interval shows that a statistical update was received for statistical update stream 158, and the following interval indicates that statistical updates were received on streams 156 and 158.

The arbiter 182 can interpret the bit patterns included in the first-in/first-serviced buffer 210 to determine the temporal ordering of the statistical update requests in terms of their order of receipt. As such, the arbiter 182 can select amongst pending statistical updates stored in the buffers 162–168 to produce a scheduled update stream 222 that orders the statistical updates according to their time of receipt. It should be noted that the first-in/first-service buffer 210 may use other encoding schemes to store the temporal order of the receipt of statistical updates. For example, in another embodiment, time intervals may not be addressed but rather when a particular statistical update is received, an encoding corresponding to its particular update stream is included in a first-in/first-out buffer. Thus, the arbiter could simply examine the next value in the first-in/first-out buffer 210 to determine the next statistical update to include in the scheduled update stream 222.

Another advantage of the arbitration scheme illustrated in FIG. 4 is that it ensures that the updates to the statistics occur in the correct temporal order such that if an entity wants to examine the statistics at any particular time while updates are occurring, the updates will have been performed in the proper order. For example, assume that five consecutive updates to statistic A are received in one update stream followed by a single update to statistic B in a different update stream. The arbitration scheme illustrated in FIG. 4 will perform the five updates to statistic A prior to performing the update to statistic B. In a weighted fair queuing or round robin arbitration scheme, the update to statistic B may occur prior to the completion of all the updates to statistic A. The execution of the updates may be important in some applications, and therefore the arbitration scheme of FIG. 4 may be preferable.

In order to increase the efficiency of the memory usage with respect to the multi-bank memory 30, multiple statistic updates may be sequenced such that the downtime associated with switching between reading and writing operations is reduced. For example, 16 statistic component read operations may occur sequentially followed by 16 write operations that update stored component values. As such, the control block 190 queues up 16 statistic update operations and performs the component reads for those operations in sequence. In order to avoid retrieving a component value for a particular statistic multiple times, a set of circuitry such as that included in FIG. 5 may be included in the control block 190.

Figure 5:
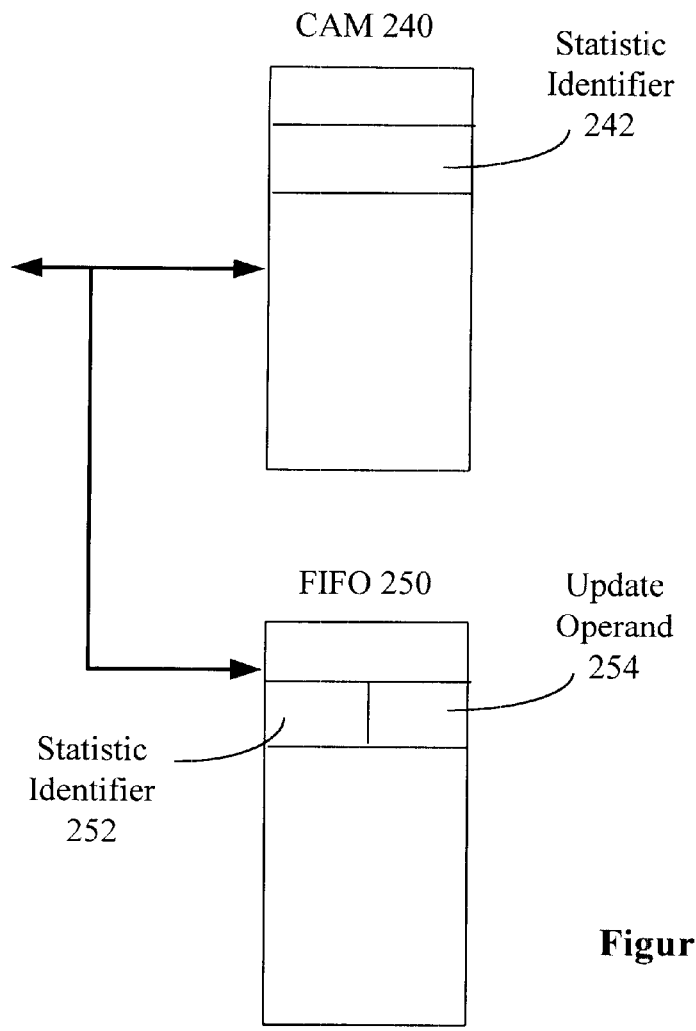
FIG. 5 illustrates a block diagram of a portion of the control block of the statistical compilation circuit of FIG. 3.

The circuitry in FIG. 5 includes a content addressable memory (CAM) 240 that allows the presence of a particular statistic within the CAM 240 to be detected. Also included in the circuitry of FIG. 5 is a first-in/first-out (FIFO) 250 that stores pending statistical updates, including the statistic identifiers and the update operands. Preferably, the storage of a particular statistic in the CAM 240 indicates the storage location of the same statistic and its corresponding update operand in the FIFO 250. Thus, if a statistic is found within the CAM 240, its location within the FIFO 250 is also known. In other embodiments, a single CAM memory structure may be used to store both the statistic identifier and the increment value, where the statistic identifier is used to address the CAM 240.

When a statistic update is received and is to be queued so that it will be executed in the following set of memory operations, the CAM 240 is first examined to determine whether or not there is already an update pending for that particular statistic. If the CAM 240 does not store an indication that that particular statistic already has a statistical update pending, the statistic 242 is added to the CAM 240. At the same time, the statistical update, which includes the statistic identifier 252 and the update operand 254 is added to the FIFO 250. If a subsequent statistical update corresponding to the same statistic is received, the presence of the statistic 242 within the CAM 240 is detected. At this point, the update operand 254 for that particular statistic update is combined with the update operand of the newly received statistic update to produce a combined update operand. The combined update operand is stored back in the FIFO 250 at the location corresponding to the update operand 254. Thus, when the statistic updates stored within the FIFO 250 are executed, a single statistic update will be performed in which both received update operands are combined with the currently stored component value.

Including the circuitry or functionality of the circuitry included in FIG. 5 in the control block 190 ensures that multiple updates to single statistics do not occur within a single set of memory operations. This can help to avoid the loss of updates that are overwritten by subsequent updates. For example, if two updates to the same statistic are performed during a single set of memory operations, both updated component values may be written to the same location such that one is overwritten. In addition to this, the memory efficiency is increased as multiple statistical updates are combined into a single statistical update operation.

Figure 6:
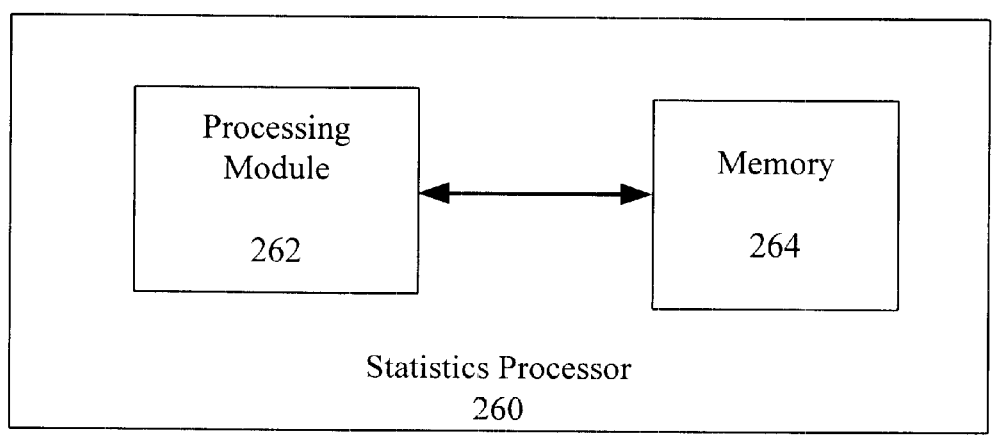
FIG. 6 illustrates a block diagram of a statistical update processor in accordance with a particular embodiment of the present invention.

The statistical compilation circuitry discussed thus far may be used in any system that requires the maintenance of a number of statistics that may be modified by a number of separate entities. In one embodiment, the plurality of statistics stored within the multi-bank memory 30 includes statistics corresponding to packet traffic or cell traffic in a communication system. These statistics may further correspond to network performance statistics, billing statistics, class of service traffic statistics, discard statistics, or statistics concerning traffic flow along particular paths within the network. FIG. 6 illustrates a statistics processor 260 that may be used to control statistic updates in a statistical compilation system. The statistics processor 260 includes a processing module 262 and memory 264. The processing module 262 may be a single processing device or a plurality of processing devices. Such a processing device may be a microprocessor, microcontroller, digital signal processor, microcomputer, state machine, logic circuitry, and/or any device that processes information based on operational and/or programming instructions.

The memory 264 may be a single memory device or a plurality of memory devices. Such a memory device may be a read only memory device, random access memory device, floppy disk, hard drive memory and/or any device that stores digital information. Note that when the processing module 262 has one or more of its functions performed by a state machine and/or logic circuitry, the memory containing the corresponding operational instructions is embedded within the state machine and/or logic circuitry. The memory 264 stores programming and/or operating instructions that, when executed, cause the processing module 262 to perform at least a portion of the steps of the method illustrated in FIG. 7. Note that the statistics processor 260 may implement some of the functions of the method through software stored in the memory 264, whereas other portions of the method may be implemented using hardware, or circuitry included within the statistics processor 260. Thus, in some embodiments, a mix of hardware and software may be used to perform the method of FIG. 7.

Figure 7:
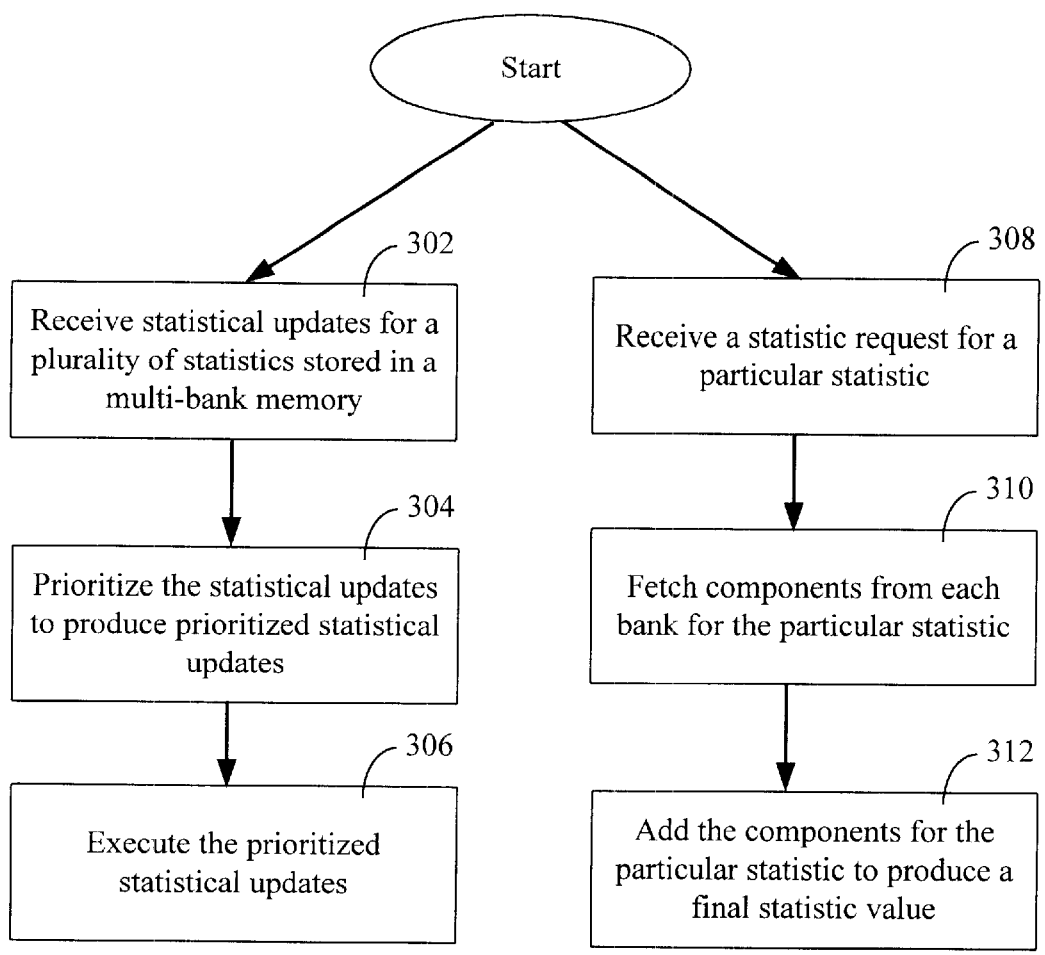
FIG. 7 illustrates a flow diagram of a method for controlling statistic updates in accordance with a particular embodiment of the present invention.

FIG. 7 illustrates a flow diagram of a method for controlling statistic updates that may be utilized in a communication system to control various statistics associated with network traffic. The method begins at step 302 where statistical updates are received for a plurality of statistics stored in a multi-bank memory. As was described with respect to FIG. 2, each bank of the multi-bank memory preferably stores a statistical component portion for at least a portion of the plurality of statistics. Preferably, the statistical updates are received via a plurality of statistical update streams.

At step 304, the statistical updates are prioritized to produce prioritized statistical updates. Preferably, the prioritization occurring at step 304 is performed by an arbiter that may perform the prioritization based on a round-robin scheme, a weighted fair queuing scheme, or a receipt sequenced priority scheme as described with respect to FIG. 4.

At step 306, the prioritized statistical updates are executed. Execution of a prioritized statistical update modifies one of the statistic component portions stored in the multi-bank memory to reflect the modification to the statistic. Preferably, each statistical update includes a statistic identifier and an update operand. More preferably, the update operand includes a value that is added to the currently stored value for that statistic in the statistic component retrieved from memory. Execution of the prioritized statistical updates may include queuing a number of statistic updates such that the memory operations associated with execution of a statistical update can be performed in a more optimal manner. As was described with respect to FIG. 5, such a queuing scheme can include a content addressable memory or other structure that enables multiple statistical updates to the same statistic to be combined prior to execution.

Execution of a particular prioritized statistical update includes reading a component value corresponding to one of the statistic component portions from the multi-bank memory, combining the operand of the statistical update with the component value to produce an updated component value, and finally storing the updated component value in the multi-bank memory.

At step 308, a statistic request is received corresponding to one of the statistics maintained within the multi-bank memory. At step 310, each of the component values for the particular statistic is retrieved from the multi-bank memory. Note that the potential for overflow within a particular component portion of the statistic within the multi-bank memory is possible, and as such, an overflow indication may be stored within the system such that any overflow that occurred in performing statistical updates is known. Finally, at step 312, each of the components, and any potential overflow indications, are combined to produce a total statistic value that is provided in response to the statistic request.

It should be noted that the method illustrated in FIG. 7 may be further optimized based on the optimizations of the circuitry illustrated in FIGS. 1–5. Similarly, portions of the method may be performed in software, whereas other portions are implemented in hardware that includes similar optimizations as those shown in FIGS. 1–5.

By providing the statistic update circuitry and methods described herein, statistic maintenance functions in communication systems and other statistic-intensive systems can be off-loaded from the processing entities that perform the functional tasks within the network or other system. This off-loading enables the functional entities to perform their tasks more efficiently. It should be understood that the implementation of variations and modifications of the invention in its various aspects should be apparent to those of ordinary skill in the art, and that the invention is not limited to the specific embodiments described. It is therefore contemplated to cover by the present invention any and all modifications, variations, or equivalents that fall within the spirit and scope of the basic underlying principles disclosed and claimed herein.

What is claimed is:

1. A statistical compilation circuits comprising:
    a multi-bank memory, wherein the multi-bank memory stores a plurality of statistics, wherein a statistic component portion for each statistic is stored in each of a plurality of banks of the multi-bank memory;
    an arbitration block operably coupled to receive at least one statistical update stream, wherein the at least one statistical update stream includes a plurality of statistical updates, wherein a statistical update includes a statistic identifier and an update operand, wherein the arbitration block schedules received statistical updates to produce a scheduled update stream;
    a control block operably coupled to the arbitration block and the multi-bank memory, wherein the control block compiles a set of read operations based on a portion of the scheduled update stream, wherein each read operation corresponds to a scheduled update in the portion of the scheduled update stream, wherein a read operation for a particular scheduled update retrieves a component value of one of the statistic component portions from one of the plurality of banks of the multi-bank memory for a statistic corresponding to the particular scheduled update, wherein the control block combines the operand for the particular scheduled update with the component value to produce an updated component value, wherein the control block compiles a set of write operations corresponding to the set of read operations, wherein the set of write operations overwrite component values fetched by the set of read operations with corresponding updated component values produced through combination operations; and
    a processing block operably coupled to the control block, wherein the processing block issues statistic requests corresponding to a requested statistic to the control block, wherein the control block retrieves component values for each component portion of the requested statistic from the multi-bank memory, wherein the control block combines the component values that are retrieved to produce a total statistic value for the requested statistic.

2. The circuit of claim 1, wherein the multi-bank memory is a single SDRAM integrated circuit.

3. The circuit of claim 1, wherein the multi-bank memory is plurality of memory integrated circuits.

4. The circuit of claim 1, wherein the multi-bank memory further comprises a plurality of multi-bank memories, wherein each multi-bank memory is used for alternating time intervals such that statistics from at least a most recent time interval are maintained while a current set of statistics is being compiled.

5. The circuit of claim 4 further comprises a plurality of memory controllers, wherein each memory controller is operably coupled to the control block and to a corresponding one of the plurality of multi-bank memories, wherein the plurality of memory controllers allow concurrent multiple memory operations to the plurality of multi-bank memories.

6. The circuit of claim 1, wherein the arbitration block further comprises a receipt sequenced priority encoder such that statistical updates are performed in temporal order based on order of receipt.

7. The circuit of claim 6, wherein the receipt sequenced priority encoder further comprises a first in first serviced buffer that stores a set of bits for each statistical update receipt interval, wherein the set of bits indicates from which statistical update stream statistical updates were received for the statistical update receipt interval.

8. The circuit of claim 1, wherein the arbitration block schedules received statistical updates based on a weighted fair queuing technique, wherein the weighted fair queuing technique schedules received statistical updates based on at least one of: priority level of each statistical update stream, and loading level of each statistical update stream.

9. The circuit of claim 1 further comprises at least one stream buffer operably coupled to the arbitration block, wherein each stream buffer buffers a corresponding statistical update stream.

10. The circuit of claim 1 further comprises an scheduled update stream buffer operably coupled to the arbitration block and the control block, wherein the scheduled update stream buffer buffers the scheduled update stream.

11. The circuit of claim 1 further comprises statistic request buffer operably coupled to the control block and the processing block, wherein the statistic request buffer buffers statistic requests from the processing block.

12. The circuit of claim 1 further comprises an overflow block operably coupled to the control block, wherein the overflow block stores indications of overflow conditions that result when an updated component value overflows an allocated bit width, wherein overflow conditions are included when the control block combines component values in response to a statistic request.

13. The circuit of claim 1, wherein the control block further comprises an update combination block, wherein the update combination block detects multiple updates to a single statistic and combines the operands of the multiple updates to produce a combined operand that is combined with the component value to produce the updated component value for the single statistic.

14. The circuit of claim 13, wherein the update combination block includes a content addressable memory.

15. The circuit of claim 1, wherein the control block controls servicing of statistic requests and statistical updates based on a control block arbitration scheme.

16. The circuit of claim 1, wherein the control block further comprises an adder that combines the operand for the particular schedule update with the component value to produce the updated component value.

17. The circuit of claim 1, wherein each statistical update is a single command issued by a datapath processor in a communications system.

18. The circuit of claim 17, wherein the plurality of statistics include statistics corresponding to at least one of: packet traffic and cell traffic in the communications system.

19. The circuit of claim 18, wherein the plurality of statistics include statistics corresponding to at least one of: network performance statistics, billing statistics, class of service traffic statistics, discard statistics, and statistics concerning traffic flow along particular paths in the network.

20. The circuit of claim 1, wherein the arbitration block schedules received statistical updates based on a round-robin scheduling scheme.

* * * * *